Patented July 28, 1953

UNITED STATES PATENT OFFICE 2,647,148

3,4-DIHYDROXY-4'-HALOGENO CHALCONES

Gustav J. Martin and Jay Morton Beiler, Philadelphia, Souren Avakian, Oreland, and Jack N. Moss, Philadelphia, Pa., assignors to The National Drug Company, Philadelphia, Pa., a corporation of Pennsylvania No Drawing. Application July 20, 1951,
Serial No. 237,834

3 Claims. (Cl. 260—590)

This invention relates to certain therapeutic compounds and more particularly to novel compositions useful in combatting infectious diseases.

An especially difficult disease to combat is one caused by parasitic organisms. Parasites cause a number of diseases in both man and animals, and therapy therefore has generally been non-specific. For instance, the trypanosomes, plasmodia and the like are usually treated with arsenic and antimony derivatives. Such materials are not only non-specific but they are actually toxic to the host. Furthermore, infectious parasites rapidly develop resistance to them.

It has now been found that certain substituted chalcones, which have been newly synthesized, are highly effective and specific therapetuic agents for diseases such as trypanosomiasis. These new products broadly comprise 3,4-dihydroxy-4'-halogeno chalcones, that is to say compounds having the general formula:

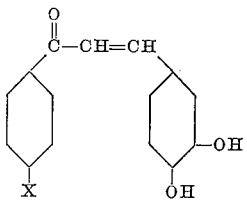

wherein X is a halogen atom. As particularly useful examples of this new class of substances may be mentioned 3,4-dihydroxy-4'-chloro chalcone, i. e.

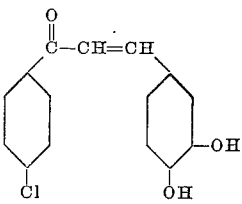

and 3,4-dihydroxy-4'-fluoro chalcone, i. e.

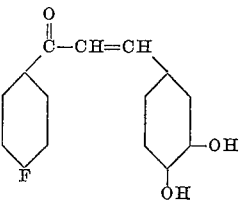

The general method for preparing such compounds is preferably to react 3,4-dihydroxy benzaldehyde with the desired substituted acetophenone. Thus, the 3,4-dihydroxy-4' chloro chalcone has been made as follows:

A solution of 10 g. of 4-chloroacetophenone and 10 g. of 3,4-dihydroxy benzaldehyde in 150 cc. of ethyl alcohol was added to 150 cc. of 20% potassium hydroxide solution and the mixture refluxed in a steam bath. After three hours the solution was cooled, added to 500 g. of ice, acidified with hydrochloric acid and filtered. Crystallization from ethyl acetate gave 8 g. of the desired compound. This new product consisted of yellow crystals melting at 224–5° C. and analyzing thus:

N (theor.) _____ percent__ 12.90
N (fd.) _____ 12.57, 12.58

Using the same mixture, but allowing the solution to stay at room temperature for 6 days instead of heating it, yielded 2 g. of the product.

Similarly, 3,4-dihydroxy-4'-fluoro chalcone was prepared by adding a solution of 20 g. of p-fluoroacetophenone and 25 g. of 3,4-dihydroxy benzaldehyde in 100 cc. of ethyl alcohol to 400 g. of 60% KOH solution. The mixture was allowed to stand 18 hours at room temperature and then acidified with hydrochloric acid (400 cc. concentrated acid and 1 kg. ice). It was then filtered, water-washed and the desired product crystallized from an ethyl acetate-ethyl alcohol mixture. Eleven grams of yellow crystals, melting at 219–220° C. were obtained.

Calcd. for $C_{15}H_{11}O_3F$: C, 69.76; H, 4.28. Found: C, 70.51, 70.09; H, 4.65, 4.40.

The therapeutic value of these novel compositions has been demonstrated by in vivo experiments with mice infected with Trypanosoma equiperdum. Twelve of these infected mice were injected subcutaneously with a saline solution of 3,4-dihydroxy-4'-chloro chalcone, sufficient to provide a 50 mg. dose per kg. of body weight. A group of 10 mice was similarly treated with a dosage of 100 mg. per kg. A third group of 10 mice was fed a diet containing 1% by weight of the new chloro chalcone product. Twenty-two mice were infected but given no therapy, to provide a control. Doses were given daily, and the experiment ran 8 days. All of the controls which died did so within the first 6 days. The results were as follows:

| Dose | Deaths | Percent Survival | Blood Examination |
|---|---|---|---|
| 50 mg./K. S. C. | 4/12 | 67 | Negative. |
| 100 mg./K. S. C. | 3/10 | 70 | Do. |
| 1% in diet | 0/10 | 100 | Do. |
| Controls | 20/22 | 9 | |

This class of chalcones is surprisingly and peculiarly specific for infections of the parasitic type. They have been determined to be ineffective in the case of various bacterial or viral diseases from other sources. Their toxicity to the host is inconsequential.

It is substantially unimportant what dosage form is chosen. Depending on the wishes of the doctor and the character of the host, the compounds may be given as solids by oral ingestion.

They may be supplied as aqueous solutions, especially in isotonic saline solution, and injected parenterally. Solutions or suspensions may also be administered intravenously, intramuscularly, subcutaneously or by any other desired method.

As many apparently widely different embodiments of this invention may be made without departing from the spirit and scope thereof, this invention is only to be deemed limited by the specific wording of the appended claims.

We claim:
1. 3,4-dihydroxy-4'-halogeno chalcones.
2. 3,4-dihydroxy-4'-chloro chalcone.
3. 3,4-dihydroxy-4'-fluoro chalcone.

GUSTAV J. MARTIN.
JAY MORTON BEILER.
SOUREN AVAKIAN.
JACK N. MOSS.

References Cited in the file of this patent

Bradsher et al., "Jour. Am. Chem. Soc.," vol. 71, pages 3570 (1949).